United States Patent
Xu et al.

(10) Patent No.: US 10,659,372 B2
(45) Date of Patent: May 19, 2020

(54) MULTI-CORE LOCK-FREE RATE LIMITING APPARATUS AND METHOD

(71) Applicant: Futurewei Technologies, Inc., Plano, TX (US)

(72) Inventors: Wei Xu, Dublin, CA (US); Xiaofeng Yang, Pleasanton, CA (US); Yan Sun, Santa Clara, CA (US); Yizhen Liu, Milpitas, CA (US); Zhe Fu, Beijing (CN); Zhi Liu, Beijing (CN); Jun Li, Beijing (CN)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 15/415,329

(22) Filed: Jan. 25, 2017

(65) Prior Publication Data

US 2018/0212889 A1 Jul. 26, 2018

(51) Int. Cl.
*H04L 12/851* (2013.01)
*H04L 12/935* (2013.01)
(Continued)

(52) U.S. Cl.
CPC ........ *H04L 47/2441* (2013.01); *H04L 47/215* (2013.01); *H04L 47/6295* (2013.01); *H04L 49/3045* (2013.01)

(58) Field of Classification Search
CPC ............. H04L 47/2441; H04L 47/6295; H04L 47/215; H04L 49/3045
See application file for complete search history.

(56) References Cited

U.S. PATENT DOCUMENTS 8,264,957 B1 9/2012 Charny et al.
2011/0292792 A1* 12/2011 Zuo .................. H04L 47/20
370/230

(Continued)

FOREIGN PATENT DOCUMENTS

CN 101188547 A 5/2008
CN 102355422 A 2/2012

(Continued)

OTHER PUBLICATIONS

S. Radhakrishnan, Y. Geng, V. Jeyakumar, A. Kabbani, G. Porter, and A. Vahdat. "SENIC: scalable NIC for end-host rate limiting." In 11th USENIX Symposium on Networked Systems Design and Implementation (NSDI 14), pp. 475-488. Feb. 2014.

(Continued)

*Primary Examiner* — Charles C Jiang
*Assistant Examiner* — Voster Preval
(74) *Attorney, Agent, or Firm* — Vierra Magen Marcus LLP

(57) ABSTRACT

An apparatus, such as a network element, comprises a receiver to receive a plurality of packets. A memory stores instructions and forms a first and second set of virtual queues to store the plurality of packets. A processor having one or more cores with one or more packet classifiers provides a classification of a packet in the plurality of packets. The processor in communication with the memory executes instructions to transfer the packet from the receiver to a virtual queue in the first set of virtual queues based on the classification. The processor also transfers the packet from the virtual queue to a transmitter based on a demand rate value and supply rate value associated with the virtual queue.

19 Claims, 10 Drawing Sheets

(51) Int. Cl.
*H04L 12/863* (2013.01)
*H04L 12/819* (2013.01)

(56) References Cited

U.S. PATENT DOCUMENTS

| | | | | |
|---|---|---|---|---|
| 2014/0281349 | A1* | 9/2014 | Peters | G06F 9/5027 |
| | | | | 711/202 |
| 2015/0301975 | A1 | 10/2015 | Garg et al. | |
| 2016/0029403 | A1* | 1/2016 | Roy | H04W 72/0406 |
| | | | | 370/336 |
| 2016/0285753 | A1 | 9/2016 | Guleria | |
| 2016/0294698 | A1* | 10/2016 | Berberana Fernandez-Murias | |
| | | | | H04L 47/12 |
| 2017/0134289 | A1* | 5/2017 | Xiao | H04L 47/70 |

FOREIGN PATENT DOCUMENTS

| | | | | |
|---|---|---|---|---|
| EP | 3076618 | A1 * | 10/2016 | H04L 47/12 |
| EP | 3076618 | A1 * | 10/2016 | H04L 47/12 |

OTHER PUBLICATIONS

Intel 82599 10GbE Controller, PDF available on http://www.intel.com/content/www/us/en/embedded/products/networking/82599-10-gbe-controller-datasheet.html, Mar. 2016, 1066 pages.

S. Radhakrishnan, V. Jeyakumar, A. Kabbani, G. Porter, and A. Vahdat. "NicPic: Scalable and Accurate End-Host Rate Limiting," In 5th USENIX Workshop on Hot Topics in Cloud Computing, Aug. 2013, 5 pages.

H. Rodrigues, J. R. Santos, Y. Turner, P. Soares, and D. Guedes. "Gatekeeper: Supporting Bandwidth Guarantees for Multi-tenant Datacenter Networks." In WIOV. May 2011, 8 pages.

V. Jeyakumar, M. Alizadeh, D. Mazières, B. Prabhakar, A. Greenberg, and C. Kim. "EyeQ: practical network performance isolation at the edge." In 10th USENIX Symposium on Networked Systems Design and Implementation (NSDI 13), pp. 297-311. Mar. 2013.

M. Alizadeh, B. Atikoglu, A. Kabbani, A. Lakshmikantha, R. Pan, B. Prabhakar, and M. Seaman. "Data center transport mechanisms: Congestion control theory and IEEE standardization." In 46th Annual Allerton Conference on Communication, Control, and Computing, pp. 1270-1277. IEEE, Sep. 2008.

M. Alizadeh, A. Greenberg, D. A. Maltz, J. Padhye, P. Patel, B. Prabhakar, S. Sengupta, and M. Sridharan. "Data center tcp (dctcp)." In ACM SIGCOMM computer communication review, vol. 40, No. 4, pp. 63-74. ACM, Jun. 2010.

Z. Liu, X. Wang, W. Pan, B. Yang, X. Hu, and J. Li. "Towards efficient load distribution in big data cloud." In 2015 International Conference on Computing, Networking and Communications (ICNC), pp. 117-122. IEEE, Mar. 2015.

S. Moon, J. Rexford, and K. G. Shin. "Scalable hardware priority queue architectures for high-speed packet switches." IEEE Transactions on Computers 49, No. 11, Nov. 2000, pp. 1215-1227.

G. Lu, C. Guo, Y. Li, X. Zhou, T. Yuan, H. Wu, Y. Xiong, R. Gao, and Y. Zhang. "ServerSwitch: A Programmable and High Performance Platform for Data Center Networks." In 8th USENIX Symposium on Networked Systems Design and Implementation (NSDI 11), pp. 15-28. Mar. 2011.

Data Plane Development Kit, downloaded from www.dpdk.org on Jan. 12, 2017, 2 pages.

The Fast Data Project (FD.io), downloaded from https://fd.io. on Jan. 13, 2017, 57 pages.

Hierarchical token bucket, downloaded from http://luxik.cdi.cz/~devik/qos/htb on Jan. 12, 2017, 4 pages.

Pktgen, downloaded from https://github.com/pktgen/Pktgen-DPDK on Jan. 13, 2017, 1 page.

Heinanen, J., et al., "A Single Rate Three Color Marker," Network Working Group, [https://tools.ietf.org/html/rfc2697], Sep. 1999, 7 pages.

Heinanen, J., et al., "A Two Rate Three Color Market," Network Working Group, [https://tools.ietf.org/html/rfc2698], Sep. 1999, 6 pages.

PCT/CN2018/073647, ISR, dated Mar. 29, 2018.

Supplementary European Search Report dated Oct. 30, 2019, in European Patent No. EP18743994.8, 8 pages.

* cited by examiner

300 —▶ $dr(i, j) = \frac{w}{T}$

*Fig.3A*

310 —▶ $sr(i, j) = \frac{dr(i, j)}{\sum_{j=0}^{n} dr(i, j)} * cr(j)$

*Fig.3B*

320 —▶ output rate $= \sum_{j=0}^{n} cr(j) = n * cr$

*Fig.3C*

Method 600 – Packets Processing

Input: sr(i,j), packet pkt with length len, time t
Output: packet processing action 1   $t_{diff} \leftarrow t - t_{last}$
2   $num_{tokens} \leftarrow num_{tokens} + t_{diff} * sr(i,j)$
3   if $num_{tokens} <$ len then
4     droppacket(pkt)
5   else
6     sendpacket(pkt)
7     $num_{tokens} \leftarrow num_{tokens} -$ len
8   endif
9   $t_{last} \leftarrow t$

*Fig. 6*

Method 700 – Scheduling parameters updating

Input: number of processor cores m, number of QoS classes n, dr(i,j), cr(j),
        $0 \leq i < m, 0 \leq j < n$
Output: sr(i,j)

1   foreach $j \in [0, ..., n)$ do
2     sum $\leftarrow$ 0
3     for i = 1 $\rightarrow$ m do
4       sum $\leftarrow$ sum + dr(i,j)
5     end
6     foreach $i \in [0, ..., m)$ do
7       sr(i,j) $\leftarrow$ dr(i,j) * cr(j) / sum
8     end
9   end

*Fig. 7*

MULTI-CORE LOCK-FREE RATE LIMITING APPARATUS AND METHOD

BACKGROUND

Modern communication networks support heterogeneous traffic, which may include movie downloading, messaging, file transfer, web traffic, and interactive traffic. Different types of traffic may have different traffic patterns and different requirements and constraints on network resources. A scheduler is commonly employed to schedule multiple flows for transmission over a specific transmission bandwidth. Network performance relies heavily on the performance of the scheduler.

SUMMARY

In a first embodiment, the present technology relates to an apparatus that comprises a receiver to receive a plurality of packets. A memory stores instructions and forms a first and second set of virtual queues to store the plurality of packets. A processor having one or more cores with one or more packet classifiers provides a classification of a packet in the plurality of packets. The processor in communication with the memory executes instructions to transfer the packet from the receiver to a virtual queue in the first set of virtual queues based on the classification. The processor also transfers the packet from the virtual queue to a transmitter based on a demand rate value and supply rate value associated with the virtual queue.

A second embodiment in accordance with the first embodiment, wherein a first core in the processor includes a first packet classifier to access the first set of virtual queues and a second core in the processor includes a second packet classifier to access the second set of virtual queues.

A third embodiment in accordance with the first through the second embodiments, wherein the first set of virtual queues have an associated first set of demand rate values and an associated first set of supply rate values and the demand rate value is included in the associated first set of demand rate values and calculated by the first core and the supply rate value is included in the associated first set of supply rate values and is calculated by another core.

A fourth embodiment in accordance with the first through the third embodiments, wherein the second set of virtual queues have an associated second set of demand rate values and an associated second set of supply rate values.

A fifth embodiment in accordance with the first through the fourth embodiments, wherein the first core calculates the associated first set of demand rate values and the second core calculates the associated second set of demand rate values.

A sixth embodiment in accordance with the first though the fifth embodiments, wherein another core is included in a network controller in communication with a scheduler. The network controller calculates the associated first set of supply rate values and the associated second set of supply rate values.

A seventh embodiment in accordance with the first though the sixth embodiments, wherein the first core writes the associated first set of demand rate values to the non-transitory memory and the second core writes the associated second set of demand rate values to the non-transitory memory. The network controller reads the associated first and second sets of demand rate values from the non-transitory memory.

An eighth embodiment in accordance with the first though the seventh embodiments, wherein the network controller writes the associated first and second sets of supply rate values to the non-transitory memory. The first core reads the associated first set of supply rate values and the second core reads the associated second set of supply rate values.

A ninth embodiment in accordance with the first through the eighth embodiments, wherein the demand rate value is calculated based on an amount of time and a number of packets that arrive at the virtual queue.

A tenth embodiment in accordance with the first through the ninth embodiments, wherein the supply rate value is calculated based on the demand rate value and a committed rate.

In an eleventh embodiment, the present technology relates to a network to transfer a plurality of packets. The network comprises a non-transitory memory including a first set of virtual queues having a first set of demand rate values and a first set of supply rate values and a second set of virtual queues having a second set of demand rate values and a second set of supply rate values. A first processor includes a first core having a receiver to receive a first packet in the plurality of packets and a first packet classifier to classify the first packet. The first packet classifier outputs the first packet to a first virtual queue in the first set of virtual queues based on a classification of the first packet. The first core calculates the first set of demand rate values. A second core also has a receiver to receive a second packet in the plurality of packets and a second packet classifier to classify the second packet. The second packet classifier outputs the second packet to a second virtual queue in the second set of virtual queues based on a classification of the second packet. The second core calculates the second set of demand rate values. A second processor calculates the first and second sets of supply rate values based on the first and second sets of demand rate values and outputs one or more control signals to output the first and second packets from the first and second virtual queues based on the first and second sets of supply rate values.

In a twelfth embodiment, the present technology relates to a computer-implemented method to limit a transfer of a plurality of packets. The method comprises receiving a packet in the plurality of packets and classifying the packet to obtain a classification of the packet. The packet is transferred to and stored in a virtual queue in a plurality of virtual queues based on the classification. A plurality of demand rate values for a plurality of virtual queues is calculated. A plurality of supply rate values is calculated for a plurality of virtual queues based on the plurality of demand rates. The packet stored in the virtual queue is output based on a supply rate associated with the virtual queue.

This Summary is provided to introduce a selection of concepts in a simplified form that are further described below in the Detailed Description. This Summary and/or headings are not intended to identify key features or essential features of the claimed subject matter, nor is it intended to be used as an aid in determining the scope of the claimed subject matter. The claimed subject matter is not limited to implementations that solve any or all disadvantages noted.

BRIEF DESCRIPTION OF THE DRAWINGS

FIGS. 3A-C illustrate equations for a demand rate value, supply rate value and output rate according to embodiments of the present technology.

FIG. 6 illustrates packet processing pseudo instructions according to embodiments of the present technology.

FIG. 7 illustrates scheduling/supply rate updating pseudo instructions according to embodiments of the present technology.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
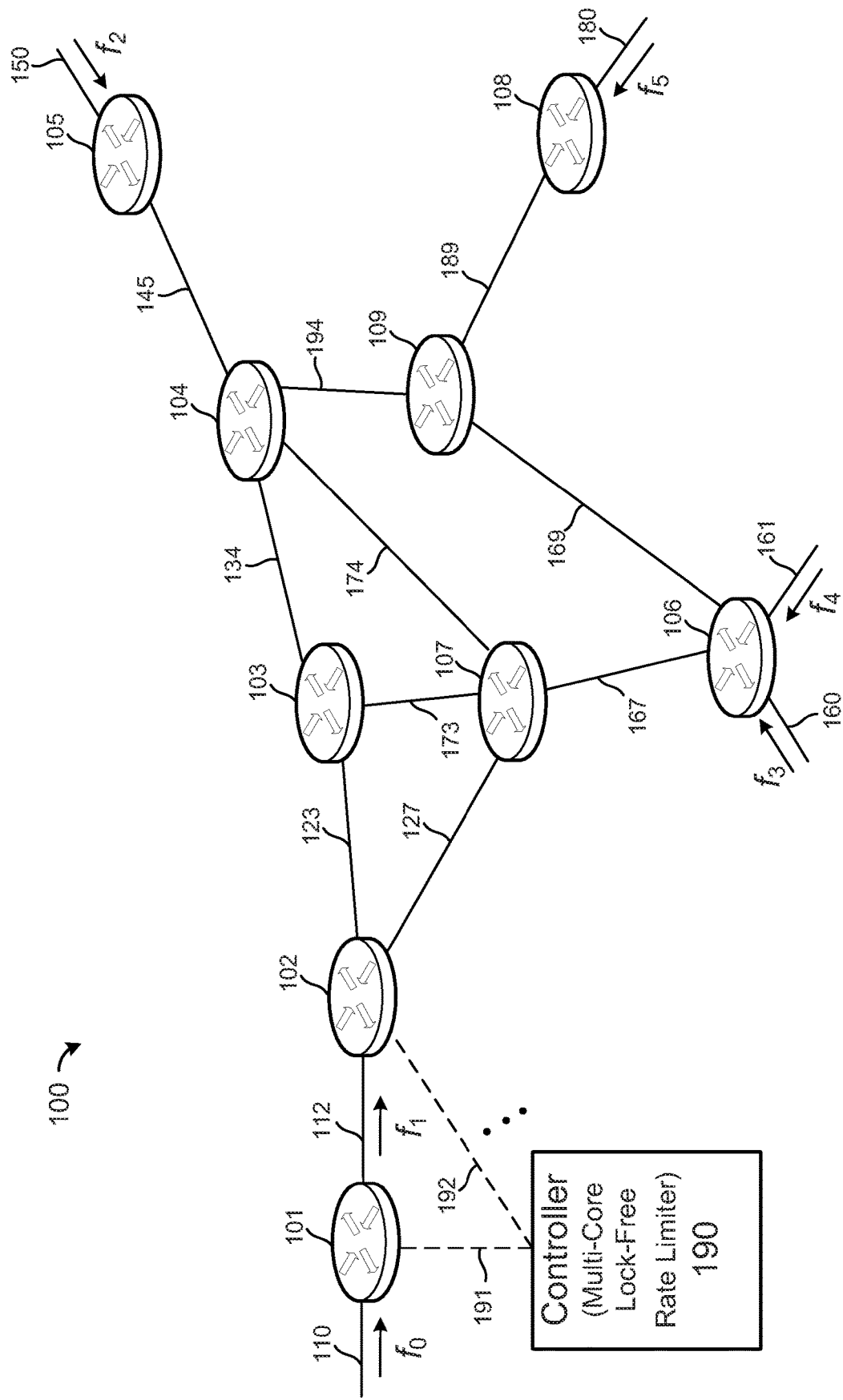
FIG. 1 is block diagram that illustrates a network that implements a multi-core lock-free rate limiting apparatus according to embodiments of the present technology.

The present technology generally relates to a multi-core, lock-free network control traffic apparatus and method. Virtual class queues are used to isolate simultaneous access to the same queue by different cores of a processor. Additional parameters, such as a demand rate value and supply rate value, are used for virtual queues to synchronize quality of service (QoS) constraints among different cores. In an embodiment, a virtual queue is implemented by software as opposed to a dedicated hardware buffer. The present technology provides improved performance and scalability with a multi-core platform and packet sizes.

The present technology may support high bandwidth network traffic processing and may accelerate the performance of the applications of a SDN (Software Defined Network) and/or NFV (Network Function Virtualization). In comparison with typical multi-core rate limiting apparatus and/or methods, the present technology achieves approximately 50% to approximately 60% higher maximum supported limiting rates. Experimental results may show that the present technology has great scalability over different numbers of processor cores as well as stable performance among packets of various sizes.

QoS network functions, which includes guarantees of latency and minimum bandwidth, rate limiting, bandwidth shaping and sharing for different traffic flows, may play an important role in quantitatively measuring the quality of service and providing differentiated services for network flows. As a part of QoS, rate limiting is used to control the rate of traffic at the input and output side. For example, a router could smooth out the traffic by limiting the rates of different flows, and a firewall could perform access control by limiting the rate of specific incoming flows.

Typically, rate limiting may be performed by hardware and/or software. Network interface controllers (NICs) may support multiple hardware transmit queues. When transmitting a packet, a request may be sent to the NIC by an operating system (OS) to notify the arrival of the packet, and an arbiter may be used by the NIC to compute the fetching order of packets from different ring buffers. The NIC may first look up the physical address of the packet, and then initiates a DMA (Direct Memory Access) transfer of the packet contents to its internal packet buffer. Finally, a scheduler may decide whether or when the packet will be transmitted.

Hardware based rate limiting may ensure low processor overhead and high accuracy. At the same time, storing masses of per-class packet queues and ring buffers for each queue on the NIC may result in poor scalability. For example, when 4,000 queues are used in the NIC and each queue stores 15 KB packet data (about 1,000 packets), it would consume about 60 MB of static random access memory (SRAM) of the NIC, which may be too expensive for a NIC application. Typical NIC hardware may only supports 8-128 rate limiters, which may carry significant limitations for fine-grained rate limiting and other QoS applications in these scenarios.

Most OSs support some type of software based rate limit function. For example, Linux offers a set of tools for managing and manipulating the transmission of packets. TC (Traffic Control) is a user-space utility program used to configure a Linux kernel packet scheduler. It uses QDisc (Queuing Discipline), which may be configured with traffic classes, to enforce flexible and scalable traffic control policies. But software based rate limiting implementation may encounter a problem of high processor overhead due to lock contention and frequent interruption. Previous experiments may show that software based rate limiting implementation consumes about 5 times more kernel processor (or central processor unit (CPU)) utilization as compared to hardware based methods.

With the rapid development of SDN (Software Defined Network) and NFV (Network Function Virtualization), more and more network functions may be virtualized and implemented on general-purpose processor platform. While allowing flexible deployment and live migration, the poor performance of these implementations may become a bottleneck for supporting high bandwidth network traffic processing. Recently, the development of data plane technology such as DPDK (Data Plane Development Kit) and fast data-input/output (fd.io) may bring new possibilities into an implementation of high performance QoS functions. However, it is still a challenge to effectively map queues on multi-core platforms while reducing overhead as much as possible.

The present technology provides a scalable multi-core lock-free rate limiting framework. Specifically, virtual QoS class queues are used to isolate simultaneous access to the same queue by different processor cores. Each core having its own virtual queues eliminates the need to provide a semaphore to control access to a queue shared by two or more processor cores. Two additional parameters, demand rate value and supply rate value, are associated or attached to each virtual class queue to synchronize the QoS constraints among different cores. Experimental results show that compared to existing multi-core rate limiting implementations, approximately 50% higher limiting rate may be achieved with present technology. In addition, the present technology may have great scalability as the number of processor cores increases.

It is understood that the present technology may be embodied in many different forms and should not be construed as being limited to the embodiments set forth herein.

Rather, these embodiments are provided so that this disclosure will be thorough and completely understood. Indeed, the disclosure is intended to cover alternatives, modifications and equivalents of these embodiments, which are included within the scope and spirit of the disclosure as defined by the appended claims. Furthermore, in the detailed description, numerous specific details are set forth in order to provide a thorough understanding of the technology. However, it will be clear that the technology may be practiced without such specific details.

FIG. 1 is a schematic diagram of an embodiment of a network 100 that includes a plurality of nodes and links as well as a controller. The plurality of nodes 101-109 may be interconnected by a plurality of links. Signals or different types of traffic flows $f_0$-$f_5$ are transferred to and from nodes in network 100 via the plurality of links, such as traffic flow $f_1$ transferred between nodes 101 and 102 by link 112. A particular traffic flow may include a plurality of packets and a link may include a particular signal path between two or more nodes. In an embodiment, controller 190 and the plurality of nodes 101-109 employs a multi-core lock-free rate limiter for transferring packets between the pluralities of nodes 101-109. Multi-core lock-free rate limiter technology may be included in one or more nodes 101-109 and/or within controller 190.

By employing multi-core lock-free rate limiter technology in a network 100, the disclosed embodiments provide improved performance and/or scalability with a multi-core platform and different packet sizes.

In an embodiment, controller 190 includes an integrated circuit processor to execute instructions stored in memory to perform a multi-core lock-free rate limiter in network 100. In an embodiment, controller 190 may output control signals to one or more nodes to limit the transfer of packets. Similarly as described herein, one or more nodes may include an integrated circuit processor to execute instructions stored in memory to perform a multi-core lock-free rate limiter.

In an embodiment, controller 190 outputs control signals to the plurality of nodes 101-109 via signal paths, such as signal paths 191-192 coupled to nodes 101 and 102. In an embodiment, controller 190 outputs control signals to links to configure signal paths between nodes.

The network 100 may be any suitable types of network, such as an electrical network and/or an optical network. In embodiments, network 100 may comprise multiple networks having internal and external links. The disclosed embodiments may be employed in conjunction with any suitable types of routing methods. The network 100 may employ any suitable network communication protocols, such as transmission control protocol/Internet protocol (TCP/IP). The network 100 may further employ any suitable types of network virtualization and/or network overlay technologies, such as SDN technologies and virtual extensible local area network (VXLAN) technologies. Network 100 may be a large-scale network, IP network, packet-switched network, centrally controlled SDN, cellular network, WiFi network (Institute of Electrical and Electronics Engineers' (IEEE) 802.11x)), satellite network, ad-hoc and sensor network or high-performance computing cluster (data center) network. In an embodiment, network 100 may include a multi-hop cellular network. The network 100 may operate under a single network administrative domain or multiple network administrative domains. The network 100 may interconnect with other networks. The links may comprise physical links, such as fiber optic links, electrical links, wireless links, and/or logical links used to transport data in network 100.

In an embodiment, network 100 includes the following node/link architecture. Traffic flow $f_0$ is provided to node 101 via link 110. Traffic flow $f_1$ is provided from node 101 to node 102 via link 112. Node 102 is coupled to nodes 103 and 107 via links 123 and 127. Node 103 is coupled to node 107 via link 173. Node 103 is coupled to node 104 via link 134 and node 107 is coupled to node 104 via link 174. Node 104 is coupled to node 105 via link 145. Flow $f_2$ is input to node 105 via link 150. Node 109 is coupled node 104 via link 194. Node 109 is coupled to nodes 106 and 108 via links 169 and 189. Node 106 is coupled to node 107 via link 167. Flows $f_3$ and $f_4$ are input to node 106 via links 160 and 161. Flow $f_5$ is input to node 108 via link 180.

A node (or network node) in the plurality of nodes 101-109 may be any suitable network element or device, such as a router or switch (including switch fabric), configured to receive and forward data in a network 100. A network element may communicate with other network elements or other networks. As shown, a node may receive traffic flows from other networks. The traffic flows or flows may be referred to as external flows or exogenous flows. Some of the flows may include high-tail (HT) traffic, while some other flows may include low-tail (LT) traffic, or a combination thereof. A node in the plurality of nodes 101-109 may employ a plurality or set of virtual queues having an associated sets of demand rate values and supply rate values. The sets of demand rate values and supply rate values may be used to determine when a stored packets are output from the set of virtual queues or limit a rate of transfer.

Typical token bucket management methods may be used for QoS requirements. Tokens typically represent a single packet or a unit of predetermined bytes, and are added into a bucket at a fixed rate. The bucket is checked to see whether it contains sufficient tokens when a packet arrives. When the bucket contains enough tokens that the packet needs, the packet is passed and several tokens (usually equivalent to the length of the packet) are removed. Otherwise, no tokens are removed from the bucket, but the packet is dropped or marked as non-conformant for further processing. A leaky bucket method may be used to limit the rate of network traffic. Unlike token bucket methods, leaky rate methods may deliver packets at a constant rate, but may lack the power of handling bursty traffic. A hierarchical token bucket method may allow for complex and granular control over traffic. A hierarchical token bucket method may classify traffic in a multilevel hierarchy, based upon a variety of parameters such as IP addresses, priority or interface. Nevertheless, these token bucket management methods may not be optimal for multi-core apparatus because they may not scale well when the number of processor cores increase.

Other rate limiting methods may limit the rate between each VM (Virtual Machine) pair to guarantee bandwidth for multi-tenant datacenter network. Rate limiter methods may use rate limiters to reduce congestion in data centers where bursty correlated traffic coupled with small buffers may result in poor application performance. These rate limiting methods may provide rate limiting, but may not focus on solving the performance bottleneck of the rate limiter itself. In addition, with a growing number of VMs and flows in data centers and virtualized network environment, the number of rate limiters may increase, bringing more challenges to rate limiting.

A system may include a rate limiter with a hardware priority queue architecture for link scheduling in high-speed switches. This rate limiter may guarantee QoS requirements in high speed networks. Other systems may have a programmable NIC for configurable congestion control management. Still other system may offload rate limiting to NetFPGA and leave the rest task to software, aiming at reducing processor load while supporting thousands of rate limiters. However, all of these system may rely heavily on particular hardware, and may lose scalability on a general-purpose processor platform.

Receive-side scaling (RSS) is a network feature of a NIC which may enable efficient distribution of input packets. With the support of RSS, network receive processes may be distributed across several hardware-based receive queues. This may allow multiple processing cores to process network traffic simultaneously and relieve bottlenecks in receive interrupt processing caused by overloading a single core. RSS may be used in processing packets on multi-core platform. However, RSS may have disadvantages as compared to the present technology.

In a single core RSS design, the single processor core takes responsibility of packets receiving and rate limiting. After packets are received from the NIC receiver, the packets are classified by the processor core and sent to several queues of various QoS classes for fine-grained traffic control.

In a multi-core RSS design, every processor core receives packets from the NIC receiver and uses its own classifier to send packets to different QoS classes. However, since traffic distribution in RSS design is determined by a NIC driver, rather than the classifier of each processor core, packets to different processor cores may be classified as the same QoS class and sent to the same queue concurrently. This may lead to simultaneous read and write operation to one queue from different processor cores. Rate limiting may fail or become abnormal without additional synchronization protections. As a result, a locking operation to the queue maybe necessary in order to accurately limit the rate of each class. For example, before processor core 0 wants to perform a write operation to QoS class queue 0, QoS class queue 0 may need to be in an unlocked status, and then may need to be kept locked until processor core 0 finishes a write operation. During the locking time of QoS class queue 0, operations (reading and/or writing) to this queue from other processor cores have to wait until this queue becomes unlocked or available after the write operation of processor core 0.

Lock contention and frequent interruption in a RSS design may lead to high processor load, which may degrade performance of packet processing on a multi-core platform. A cause of frequent lock contention and interruption in a RSS design may be that multi-cores share the queues of the same QoS class. Due to the fact that a NIC RSS driver distributes packets for multi-core processing while the user-defined classifier classifies packets to different QoS classes, it is not likely that packets are sent to the appropriate QoS class queues directly from the NIC.

Figure 2:
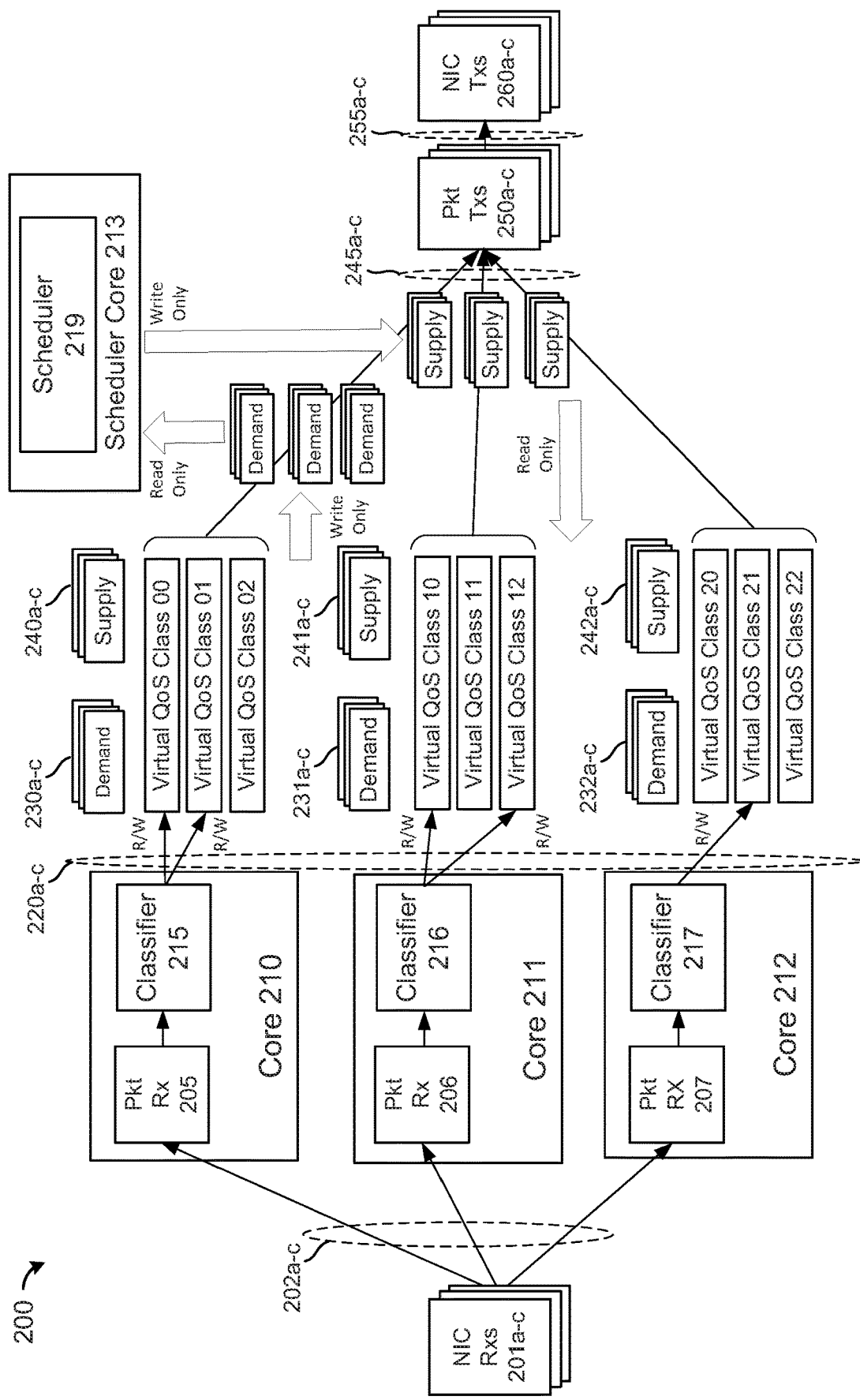
FIG. 2 illustrates a plurality of cores and virtual queues according to embodiments of the present technology.

FIG. 2 illustrates a plurality of virtual queues in an apparatus 200 having multi-cores that may eliminate locking according to embodiments of the present technology. Sets of virtual QoS class queues (or virtual queues, virtual class queues) are used. In an embodiment, a virtual class queue itself is not a complete Qdisc (or component of Linux traffic control), but acts as a portion of a complete Qdisc. FIG. 2 depicts the relationship between virtual class queues and typical class queues for classful rate limiting. Virtual QoS class queue 00, 10 and 20 are three sub class queues that together make up the class queue 0. On the other hand, virtual QoS class queue 00, 01 and 02 are the sub class queues which are mapped on core 210 and may only be accessed by processor core 210.

In an embodiment, a virtual QoS class queue is defined as follows: For a rate limiting implementation on m cores platform with n QoS classes, there are m*n virtual QoS class queues, where vcq(i,j) denotes a virtual class queue mapped on processor core i and used for QoS class j, $0 \le i < m$ and $0 \le j < n$.

Sets of virtual class queues eliminate the lock contention caused by multi-core's access to shared resources or a particular queue because each processor core can only access its own virtual class queues. For example, if two processor cores shared a same queue, one core would be locked out from accessing the queue while the other core had access to it. In order to ensure the classful rate limiting effects, another two parameters are attached to or associated with each virtual class queue: demand rate (or demand rate value) and supply rate (or supply rate value) depicted as "demand" and "supply" in FIG. 2. For example, sets of demand rate values 230*a-c* and supply rate values 240*a-c* are associated with a set of virtual queues (virtual QoS class 00, 01 and 02).

A demand rate value is a parameter that represents a demand rate of input packets in a virtual class queue in an embodiment. At a period T of a token update (token period of time), w packets arrive in a virtual class queue vcq(i,j), so a demand rate dr(i,j) for this virtual class queue is defined at 300 in FIG. 3A in an embodiment.

A supply rate value is one or a set of parameters which represents the actual packets transmission rate of a virtual class queue in an embodiment. Under particular supply rate values, a virtual class queue is expected to dequeue at a predetermined average rate in an embodiment.

Sets of virtual class queues together with demand and supply rate values enables a lock-free rate limiting embodiment for classful QoS on a multi-core apparatus. As shown in FIG. 2, each processor core (cores 210-212) only needs write permission to the demand rate parameters and read permission to the supply rate parameters of its own virtual class queues. A scheduler (which may be assigned to an independent processor core or scheduler core 213 executing scheduler 219) takes charge of all demand rate value collection (or reads) and supply rate update (or calculation, writes). In an embodiment, scheduler 219 needs one permission to the parameter as well: read permission to all demand rate values and write permission to all supply rate values.

In an embodiment, for virtual class queue vcq(i,j), demand rate dr(i,j) may be written by processor core i and read by a scheduler core, and supply rate sr(i,j) may be written by the scheduler core and read by processor core i.

A scheduler core 213 (executing scheduler 219) periodically fetches a demand rate value of each virtual class queue and recalculates supply rate values correspondingly. Various scheduling methods may be used in different embodiments. For instance, for a rate limiting embodiment on m cores platform and n QoS classes, there are m*n virtual QoS class queues. For a demand rate value of each virtual class queue is dr(i,j), $0 \le i < m$, $0 \le j < n$, a method to calculate a supply rate parameter sr(i,j) is shown at 310 in FIG. 3B where cr(j) denotes the committed rate for QoS class j in an embodiment.

Method 600 in FIG. 6 shows a simplified pseudo-code of packets processing procedure for each virtual class queue in an embodiment. Every period T, a demand rate value dr(i,j) is calculated using 300 in FIG. 3A in an embodiment.

Method 700 in FIG. 7 shows a simplified pseudo-code for updating a supply rate value sr(i,j) for each virtual class queue in an embodiment. In an embodiment, sr(i,j) is calculated using 400 in FIG. 3B in an embodiment. Scheduler core 213 executing scheduler 219 performs method 700.

In embodiments, scheduler 219 may employ a variety of different types of fairness methods, including FIFO (First-in, First-out), WFQ (Weighted Fair Queuing), max-min, etc.

A detailed description of apparatus 200 in FIG. 2 is provided below. In an embodiment, apparatus 200 is a multi-core lock-free rate limiter in at least one of the nodes of network 100. In another embodiment, apparatus 200 (or components thereof) is included in multiple nodes in network 100. In still another embodiment, apparatus 200 is included in at least one node and a controller 190 in network 100. In an embodiment, apparatus 200 is a switch, such as a software-design (SD) switch according to embodiments of the present technology. In embodiments, at least one SD switch is used in network 100. For clarity in describing the present technology, some typical components in a node or switch of a network 100 are not illustrated.

In embodiments, apparatus 200 receives one or more traffic flows having a plurality of packets at network interface controller receivers (NIC Rxs) 201*a-c* from one or more links (or signal paths). In alternate embodiments, NIC Rxs 201*a-c* may be replaced with a single or more receivers.

NIC Rxs 201*a-c* then forwards received packets to cores 210-212 in one or more processors. In particular, NIC Rxs 201*a-c* forwards packets to respective packet receivers (Pkt Rxs) 205-207 in cores 210-212 via signal paths 202*a-c*. Cores 210-212 also include respective classifiers 215-217 to classify or provide a classification for one or more packets received by Pkt Rxs 205-207. In embodiments, classifiers 215-217 are software components stored in memory that include computer instructions that are executed by respective cores 210-212. In embodiments, classifiers 215-217 may be firmware or digital circuits to provide classifications of packets.

In embodiments, classifiers 215-217 determines which QoS class a particular received packet belongs to by reading a field or identifier in the packet. In an embodiment, a packet includes digital information that may represent, among other types of information, text, voice, image, video, data, game or control (status) information. In an embodiment, the packets are received from a cellular network having a base station with an antenna to receive cellular (radio frequency) signals having the information. Based on the classification of a received packet, cores 210-212 forwards the packets to virtual queues, such as virtual QoS class queues, via signal paths 220*a-c*.

In embodiments, virtual QoS class queues are formed or grouped into sets associated with particular cores. By forming the plurality of virtual queues into sets that are accessible by particular associated cores, locking of a queue (or prohibiting a read or write operation from or to the queue) may be avoided. For example, virtual QoS class queues 00-02 are accessible by core 210. In an embodiment, cores 211 and 212 may not access virtual QoS class queues 00-02. Similarly, virtual QoS class queues 10-12 are accessible by core 211. In an embodiment, cores 210 and 212 may not access virtual QoS class queues 10-12. Similarly, virtual QoS class queues 20-22 are accessible by core 212. In an embodiment, cores 210 and 211 may not access virtual QoS class queues 20-22.

Each set of virtual queues also has associated sets of demand and supply rate values to synchronize the transfer and/or limit the transfer of packets from the virtual queues. For example, virtual QoS class queues 00-02 have associated or attached demand rate values 230*a-c* and supply rate values 240*a-c* stored in memory. For example, virtual QoS class queue 00 has an associated demand rate value 230*a* and supply rate value 240*a*, virtual QoS class queue 01 has an associated demand rate value 230*b* and supply rate value 240*b*, etc. Similarly, virtual QoS class queues 10-12 and 20-22 have associated or attached sets of demand rate values 231*a-c* and supply rate values 241*a-c* as well as sets of demand rate values 232*a-c* and supply rate values 242*a-c* stored in memory.

In embodiments, respective cores calculate and write the demand rate values in memory. For example, core 210 calculates and writes the demand rate values 230*a-c* while core 211 calculates and writes the demand rate values 231*a-c* and core 212 calculates and writes the demand rate values 232*a-c*. Scheduler core 213 executing scheduler 219 may read demand rate values, but may not write demand rate values in an embodiment. In an embodiment, cores 210-212 may read respective supply rate values, but may not write supply rate values.

In an embodiment, scheduler 219 is a software component stored in memory that includes computer instructions to perform multi-core lock-free rate limiting and other functions. In an embodiment, scheduler core 213 executing scheduler 219 performs a synchronization (or rate limiting) of outputting the packets stored in virtual queues to packet transmitters (Pkt Txs) 250*a-c* via signal paths 245*a-c*. In embodiments, packets are output from virtual queues in response to demand rate values read by scheduler core 213 (executing scheduler 219) and supply rate values calculated and stored by scheduler core 213, such as supply rate values 240*a-c*, as described herein. In an embodiment, scheduler core 213 executes scheduler 219 to output control signals to virtual queues that synchronize or limit the rate of outputting packets stored in the virtual queues to the Pkt Txs 250*a-c*.

As described herein, virtual queues from respective sets of virtual queues form a queue for a particular QoS class. For example, virtual QoS class queue 00, 10 and 20 which are accessible by respective cores 210-212 are sub-classes of a particular QoS class 00. Similarly, virtual QoS class queues 01, 11 and 21 which are accessible by respective cores 210-212 are sub-classes of a particular QoS class 01. Also, virtual QoS class queues 02, 12 and 22 which are accessible by respective cores 210-212 are sub-classes of a particular QoS class 02.

Packets received by Pkt Txs 250*a-c* are output to network interface controller transmitters (NIC Txs) 260*a-c* via signal paths 255*a-c*. Packets may then be output to one or more signal paths (or links) coupled to NIC Txs 260*a-c* as illustrated in FIG. 1.

Figure 4:
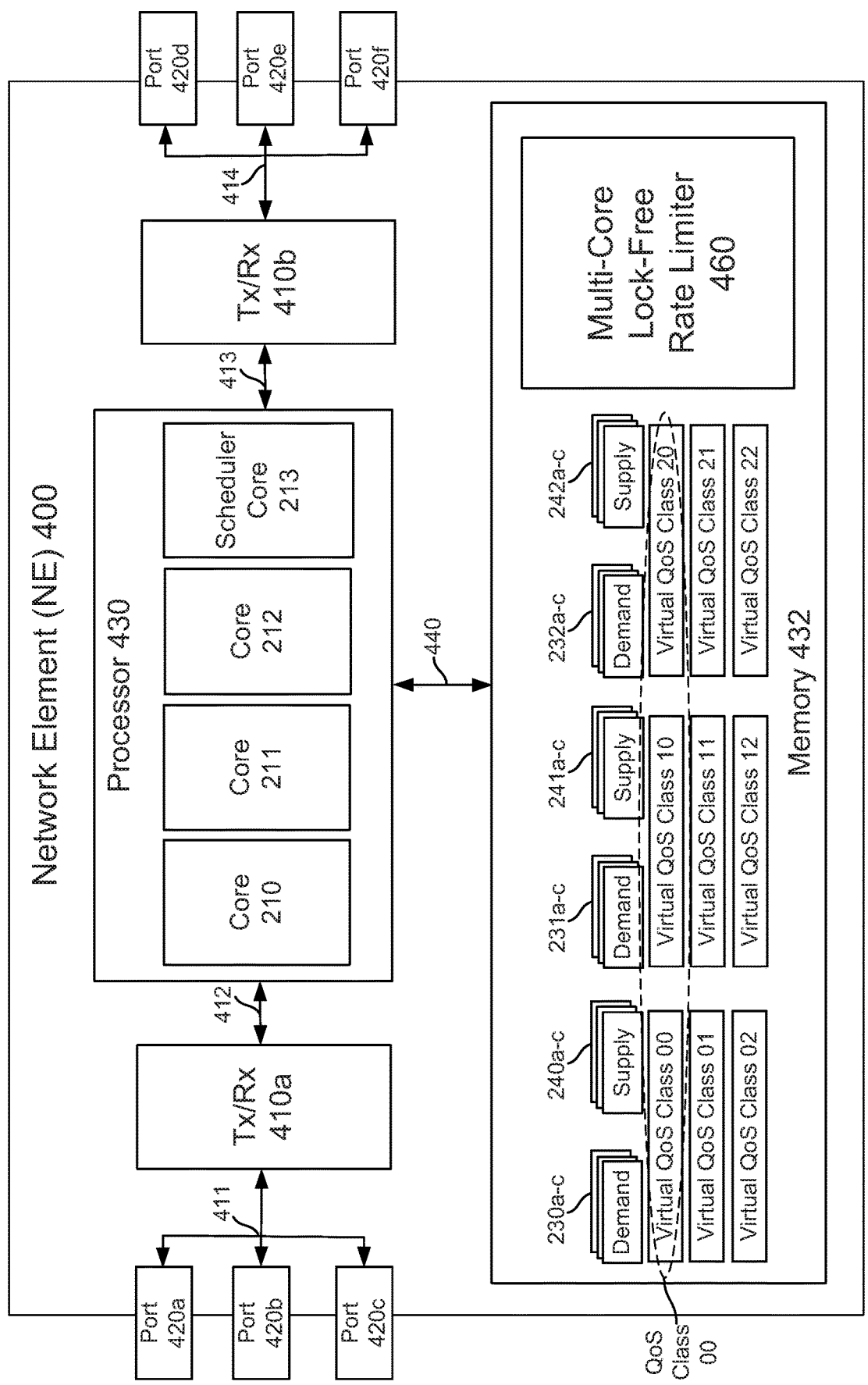
FIG. 4 illustrates a network element according to embodiments of the present technology.

FIG. 4 illustrates a network element 400 according to embodiments of the present technology. Network element 400 is any suitable device that transports or transfers packets through a network in embodiment, such as a switch, router, bridge, firewall, server, a client, etc. Network element 400 may be configured to implement and/or support a multi-core lock-free rate limiter as described herein. Network element 400 may be implemented in a single network node or the functionality of network element 400 may be implemented in a plurality of network nodes. One skilled in the art will recognize that the term network element encompasses a broad range of devices of which network node is merely an example. In embodiments, network element 400 (or components thereof) may be included in one or more nodes and/or in controller 190 as shown in FIG. 1.

At least some of the components/methods described in the disclosure are implemented in a network apparatus or component such as network element 400. For instance, the components/methods in the disclosure may be implemented using hardware, firmware, and/or software installed to run on hardware.

As shown in FIG. 4, the network element 400 comprises transceivers (Tx/Rxs) 410a-b, which may be transmitters, receivers, or combinations thereof. In embodiments, more or less transceivers may be used. A Tx/Rx 410a is coupled to a plurality of ports 420a-420c via signal path 411 for transmitting and/or receiving packets from other nodes via links. Tx/Rx 410a is also coupled to processor 430 via signal path 412. Similarly, Tx/Rx 410b is coupled to a plurality of ports 420d-420f via signal path 414 for transmitting and/or receiving packets from other nodes via links. Tx/Rx 410b is also coupled to processor 430 via signal path 413.

A processor 430 is coupled to each Tx/Rxs 410a-b to process the packets and/or determine which nodes to send the packets to. In an embodiment, processor 430 may include one or more types of electronic processors having one or more cores. In an embodiment, processor 430 is an integrated circuit processor that executes (or reads) computer instructions that may be included in code and/or computer programs stored on a non-transitory memory to provide at least some of the functions described herein. In an embodiment, processor 430 is a multi-core processor capable of executing multiple threads. In an embodiment, processor 430 includes cores 210-212 as well as scheduler core 213. In an embodiment, scheduler core 213 may be included in a controller, such as a controller 190, and may communicate with network element 400 via a signal path, such as signal path 192. In an embodiment, processor 430 is a digital signal processor, baseband circuit, field programmable gate array, digital logic circuit and/or equivalent. In an embodiment, processor 430 may be part of one or more application specific integrated circuits (ASICs) and/or digital signal processors (DSPs).

Processor 430 communicates with memory 432 via signal path 440, such as reads instructions, read values, write values and transfers packets to and from virtual queues formed in memory 432. In an embodiment, signal path 440 may be a bus or interconnect to transfer signals between processor 430 and memory 432. Signal path 440 may also transfer control signals between processor 430 and memory 432. Memory 432 may be a non-volatile memory that stores instructions as well as acts as a data store, cache, queue, buffer and/or equivalent.

Figure 5:
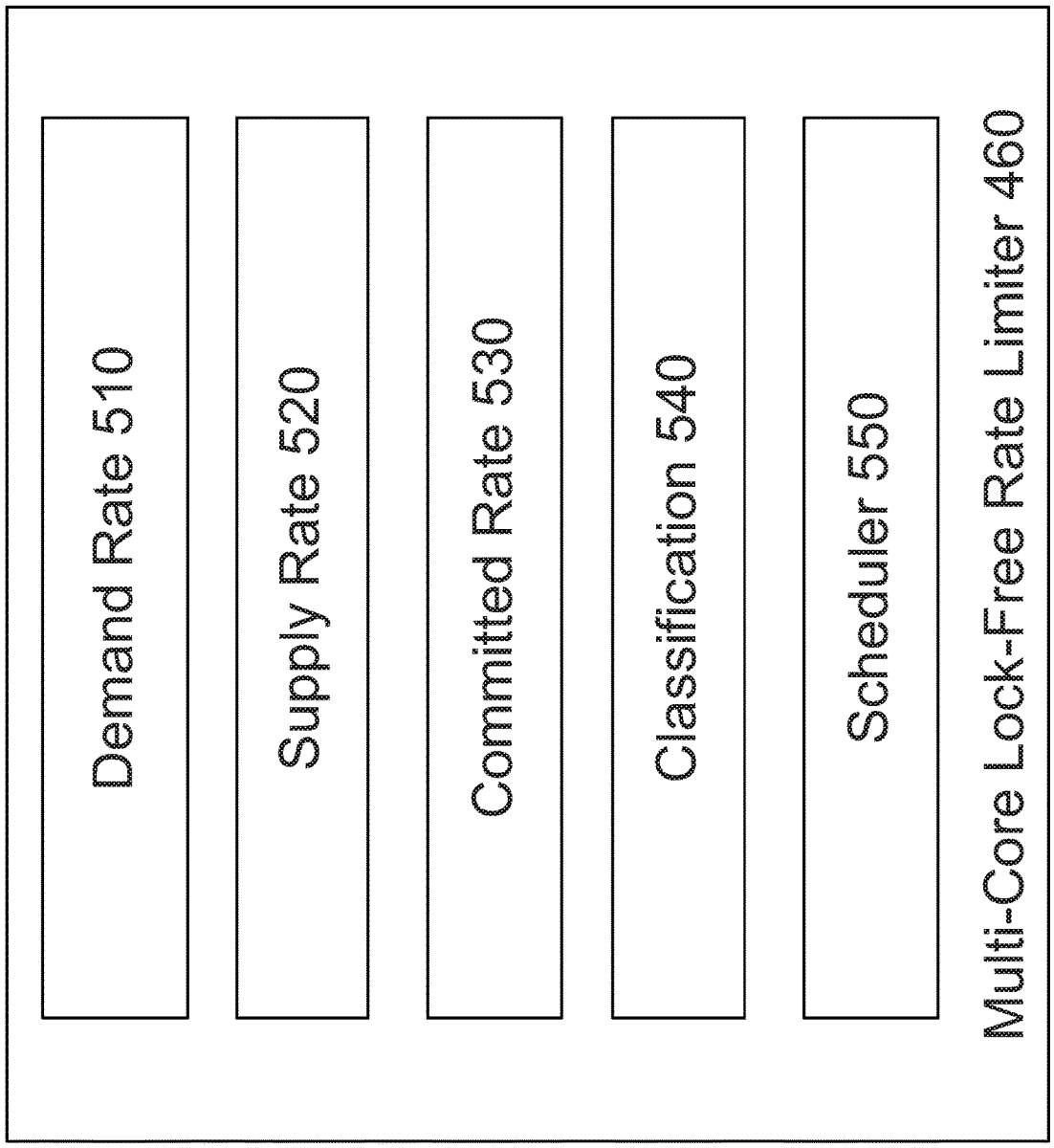
FIG. 5 illustrates a software architecture according to embodiments of the present technology.

A processor 430 (or cores of processor 430) may execute a software component having instructions, such as multi-core lock-free rate limiter 460, to perform scheduling and/or rate limiting, as discussed more fully herein. In an embodiment, scheduler core 213 executes computer instructions stored in multi-core lock-free rate limiter 460 to perform many of the functions described herein. For example, scheduler core 213 executes multi-core lock-free limiter 460 to output control signals, via signal path 440, to output stored packets in virtual queues of memory 432 to Tx/Rxs 410a-b via signal paths 440 and 412 or 413. A software architecture embodiment of multi-core lock-free rate limiter 460 is illustrated in FIG. 5 and described in detail herein. Further, multi-core lock-free rate limiter 460 effects a transformation of a particular article (such as a network element or network) to a different state.

In an embodiment, memory 432 also includes a plurality of queues which may include sets of virtual QoS class queues. The plurality of virtual queues may be formed into sets that are accessible by particular associated cores in processor 430. By forming the plurality of virtual queues into sets that are accessible by particular associated cores, locking of a queue (or prohibiting a read or write operation from or to the queue) may be avoided. In embodiments, virtual QoS class queues are similarly accessed by respective associated cores as described in regard to FIG. 2.

Each set of virtual queues also has associated sets of demand and supply rate values to synchronize the transfer and/or limit the transfer of packets from the virtual queues. In embodiments, the set of virtual queues operate similarly to the sets of virtual queues described in regard to FIG. 2.

In embodiments, respective cores calculate and write the demand rate values in memory 432. For example, core 210 calculates and writes the demand rate values 230a-c while core 211 calculates and writes the demand rate values 231a-c and core 212 calculates and writes the demand rate values 232a-c. In an embodiment, a demand rate value is calculated using an equation at 300 in FIG. 3A. Scheduler core 213 may read demand rate values, but may not write demand rate values in an embodiment.

In embodiments, scheduler core 213 executing multi-core lock-free rate limiter 460 calculates and writes supply rate values, such as supply rate values 240a-c, in memory 432. In an embodiment, scheduler core 213 executing multi-core lock-free rate limiter 460 writes supply rate values in response to reading demand rate values. In an embodiment, cores 210-212 may read supply rate values, but may not write supply rate values.

Virtual queues from respective sets of virtual queues form a queue for a particular QoS class as similarly described in regard to FIG. 2.

Memory 432, as well as other memories described herein, may comprise any suitable type of system memory such as SRAM, dynamic random access memory (DRAM), synchronous DRAM (SDRAM), read-only memory (ROM), a combination thereof, or the like. In an embodiment, a memory 432 may include ROM for use at boot-up, and DRAM for program and data storage for use while executing computer instructions. In embodiments, memory 432 is non-transitory or non-volatile integrated circuit memory storage. Similarly, storages described herein may be non-transitory or non-volatile integrated circuit memory storage.

Further, memory 432 may comprise any suitable type of memory storage device configured to store data, store computer programs including instructions, and store other information and to make the data, computer programs, and other information accessible via signal path 440. Memory 432 may comprise, for example, one or more of a solid state drive, hard disk drive, magnetic disk drive, optical disk drive, and/or an equivalent.

For clarity in describing the present technology, some typical components in a network element 400 are not shown in FIG. 4. For example, network element 400 may include additional signal paths (exterior or interior) and/or interface circuits in embodiments. For example, one or more control signals may be provided to network element 400 by way of signal path from a controller, such as controller 190 in an embodiment. In an embodiment, one or more control signals may be input to processor 430 to control a particular state or operation of network element 400. For example, one or more control signals may synchronize the outputting of stored packets in the sets of virtual queues. Similarly, network element 400 may output control or status signals to a network controller, and/or other network element, from processor 430 via a similar signal path.

FIG. 5 illustrates a software architecture 500 according to embodiments of the present technology. In embodiments, multi-core lock-free rate limiter 460 includes a plurality of software components, such as demand rate 510, supply rate 520, committed rate 530, classification 540 and scheduler 550. In embodiments, software components may be embodied as a computer program, object, function, subroutine, method, software instance, script, a code fragment, stored in an electronic file, singly or in combination. In order to clearly describe the present technology, software components shown in FIG. 5 (as well as in FIGS. 2 and 4) are described as individual software components. In embodiments, the software components illustrated, singly or in combination, may be stored (in single or distributed computer-readable storage medium(s)) and/or executed by a single or distributed computing device (processor or multi-core processor) architecture. Functions performed by the various software components described herein are exemplary. In other embodiments, software components identified herein may perform more or less functions. In embodiments, software components may be combined or further separated.

In embodiments, software components illustrated herein may be replaced with similar hardware components or logic/circuits which are configured to perform similar functions.

Demand rate 510 is responsible for, among other functions, calculating a demand rate value for one or more virtual queues. In embodiment, respective processor cores execute demand rate 510 to calculate and store one or more demand rate values associated with associated sets of virtual queues that may be read by a scheduler core executing a scheduler, such as scheduler 550. For example, core 210 executing demand rate 510 calculates and stores demand rate values 230a-c, associated with core 210, in non-volatile memory that is readable by scheduler core 213. In an embodiment, demand rate 510 calculates a demand rate value by using an equation at 300 in FIG. 3A. In other embodiments, other equations may be used to calculate a demand rate value.

Supply rate 520 is responsible for, among other functions, calculating a supply rate value for one or more virtual queues. In embodiment, a scheduler core executes a scheduler to calculate and store one or more supply rate values associated with sets of virtual queues that may be read by an associated processor core. For example, scheduler core 213 executing scheduler 550 calculates and stores supplyrate values 240a-c, associated with core 210, in non-volatile memory that is readable by core 210. In an embodiment, supply rate 520 calculates a supply rate value by using an equation at 310 in FIG. 3B. In other embodiments, other equations may be used to calculate a supply rate value.

Committed rate 530, responsible for, among other functions, calculating a committed rate cr as described herein. In alternate embodiments, other way of calculating a committed rate cr may be used.

Classification 540 is is responsible for, among other functions, classifying a received packet. In an embodiment, a core executes classification 540 to determine what QoS classification corresponds to a received packet. In an embodiment, classification 540 reads a header or fields in a packet to determine the appropriate QoS class. In an embodiment, classification 540 (executed by an associated core) outputs a packet that has been classified to the appropriate virtual queue, such as virtual QoS class queues 00, 01 and 02 shown in FIG. 2, in response to the determined classification. In an embodiment, classification 540 represents a plurality of classification software components, such as classifiers 215-217 shown in FIG. 2

Scheduler 550 is responsible for, among other functions, scheduling the output of packets stored in virtual queues. Scheduler 550 also may be known as a network scheduler or packet scheduler. Scheduler 550 manages the sequence of network packets in the transmit and/or receive queues of a NIC in an embodiment. In an embodiment, scheduler 550 corresponds to scheduler 219 illustrated in FIG. 2. In an embodiment, scheduler 550 may be stored in non-volatile memory and executed by a processor in network controller (or network controller processor core) that outputs control signals to network elements. In an embodiment, these control signal may time (or limit) the transfer rate of packets received and/or output from network elements, in particular virtual queues. In an alternate embodiment, scheduler 550 is stored in a network element having virtual queues. In an embodiment, scheduler 550 may include supply rate 520 and/or committed rate 530.

Figure 8:
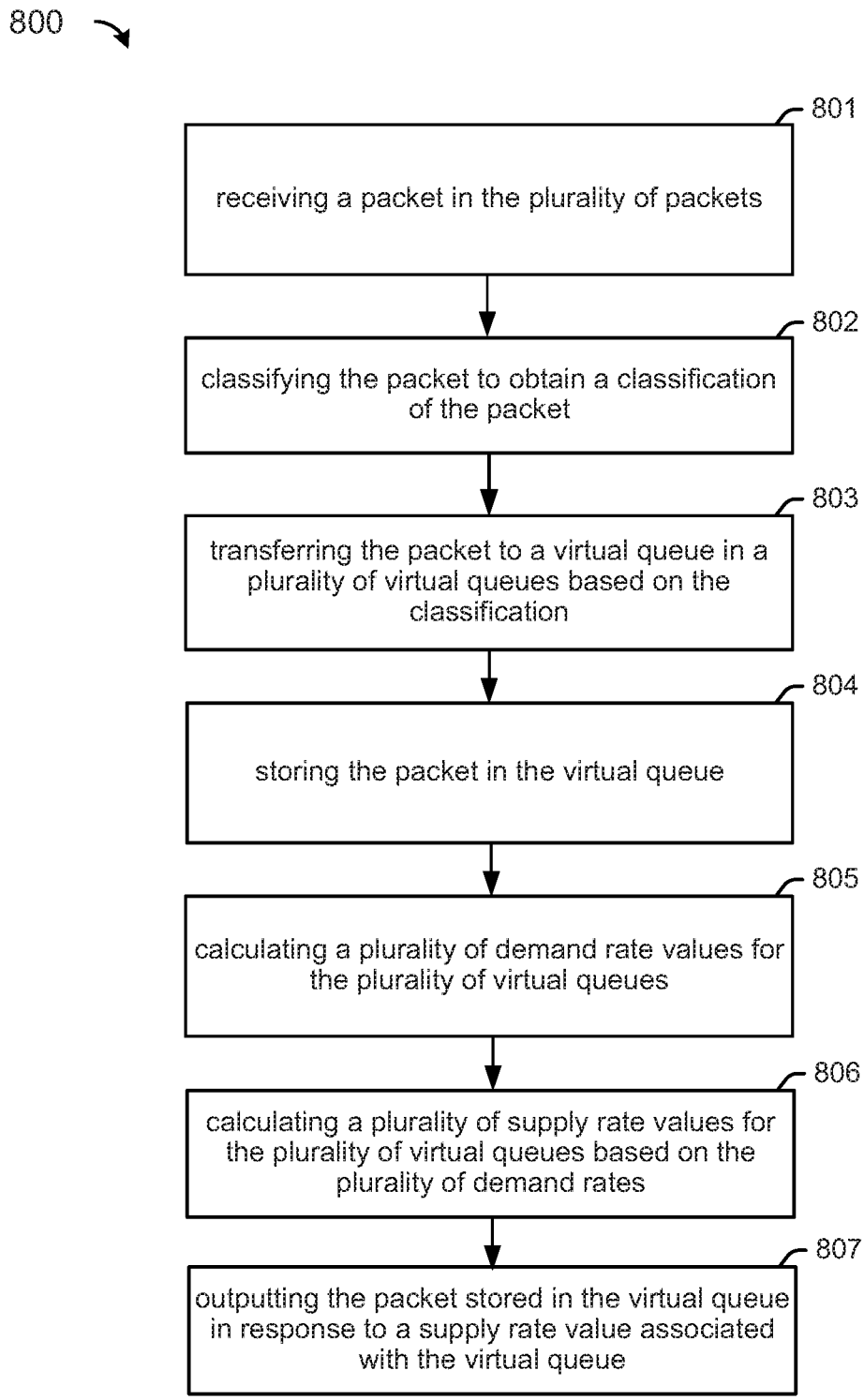
FIG. 8 is a flowchart that illustrates a method of operating a network according to embodiments of the present technology.

FIG. 8 is a flowchart that illustrates a method 800 of operating a network according to embodiments of the present technology. In embodiments, methods illustrated in FIGS. 6-8 are computer-implemented methods performed, at least partly, by hardware and/or software components illustrated in FIGS. 1-2 and 4-5 and as described herein. In an embodiment, software components executed by one or more processors, such as processor 430 shown in FIG. 4, perform at least a portion of the methods. In other embodiments, hardware components perform one or more functions described herein.

FIG. 8 is a flowchart that illustrates a method 800 of multi-core lock-free rate limiter according to embodiments of the present technology. In FIG. 8 at 801 one or more packets in the plurality of packets is received. In an embodiment, this function as well as the function at 802-807 are performed by one or more components illustrated in FIGS. 1-2 and 4-5. In embodiments, Pkt Rxs 205-207 in cores 210-212 as shown in FIG. 2, performs at least a portion of this function.

At 802 the received packet is classified to obtain a classification of the packet. In embodiments, classifier 215 executed by processor core 210 performs at least a portion of this function.

At 803 the packet is transferred to a virtual queue in a plurality of virtual queues based on the classification. In embodiments, classifier 215 executed by processor core 210 performs at least a portion of this function.

At 804 the packet is stored in a virtual queue, such as in one of virtual QoS queues class 00, 01 or 02 shown in FIG. 2

At 805 a plurality of demand rate values for a plurality of associated virtual queues is calculated. In embodiments, demand rate 510 as shown in FIG. 5, executed by processor core 210 performs at least a portion of this function and stores the demand rate values 230a-c in non-volatile memory 432, as shown in FIG. 4.

At 806 a plurality of supply rate values for a plurality of associated virtual queues is calculated based on the plurality of demand rates. In embodiments, supply rate 520 as shown in FIG. 5, executed by scheduler core 213 performs at least a portion of this function and stores the supply rate values 240a-c in non-volatile memory 432, as shown in FIG. 4.

At 807 a packet stored in the virtual queue is output in response to a supply rate value associated with the virtual queue. In an embodiment, scheduler 219 executed by scheduler core 213 performs at least a portion of this function.

A series of experiments were conducted to evaluate the performance and scalability of the present technology. Experiments were conducted on two HP Z228 SFF workstations with an Intel® Core™ i7-4790 CPU platform (8 logic cores), Intel® 82599ES 10 Gigabit Ethernet Controller, and DPDK 16.04 installed for low-level packet processing. DPDK is a set of libraries and drivers for fast packet processing. A Pktgen traffic generator by Intel's DPDK is used to send traffic at wire rate and perform statistical analysis. A scheduler having multi-core lock-free rate limiter is employed to update supply rate values of each virtual class queue as described herein.

Figure 9A:
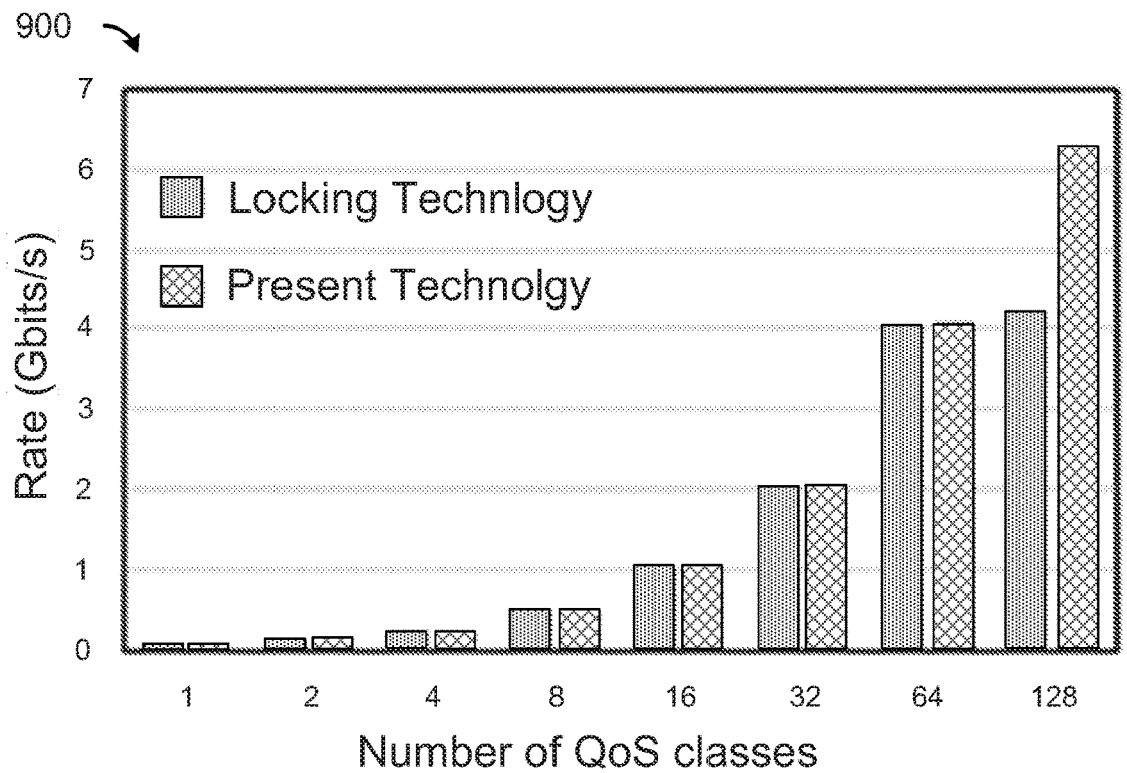
FIG. 9A-C illustrates graphs according to embodiments of the present technology.
Figure 9B:
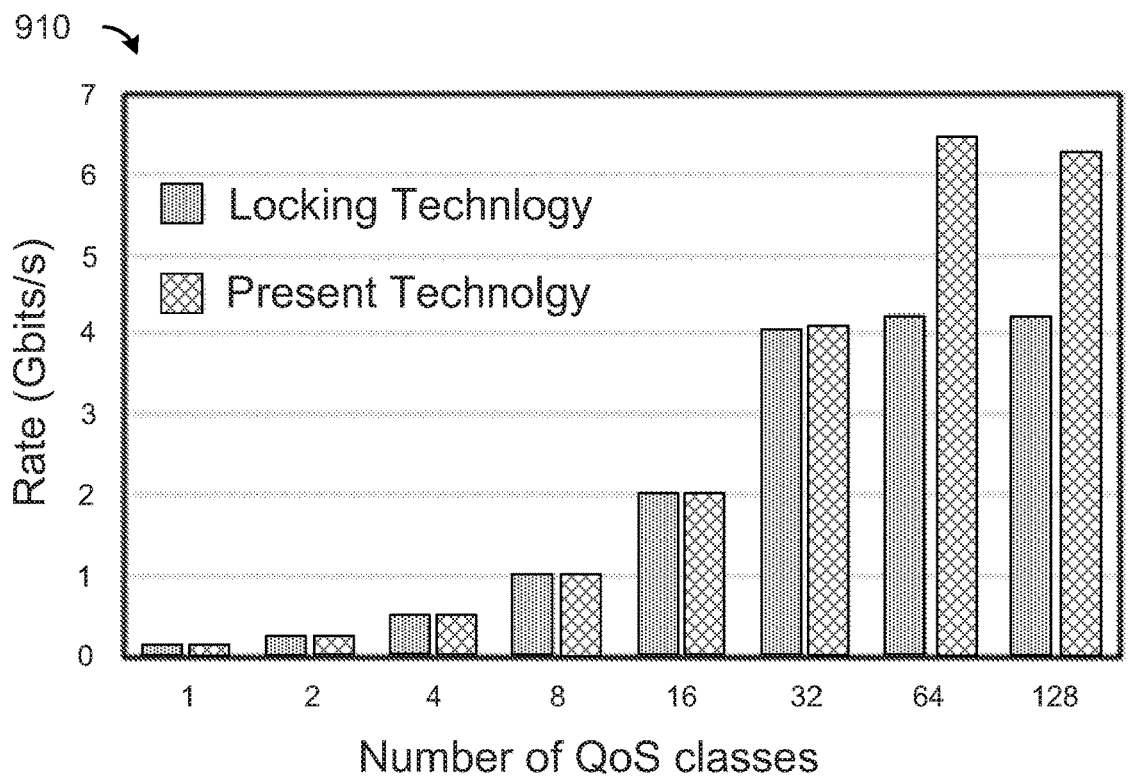
Figures 9C, 10:
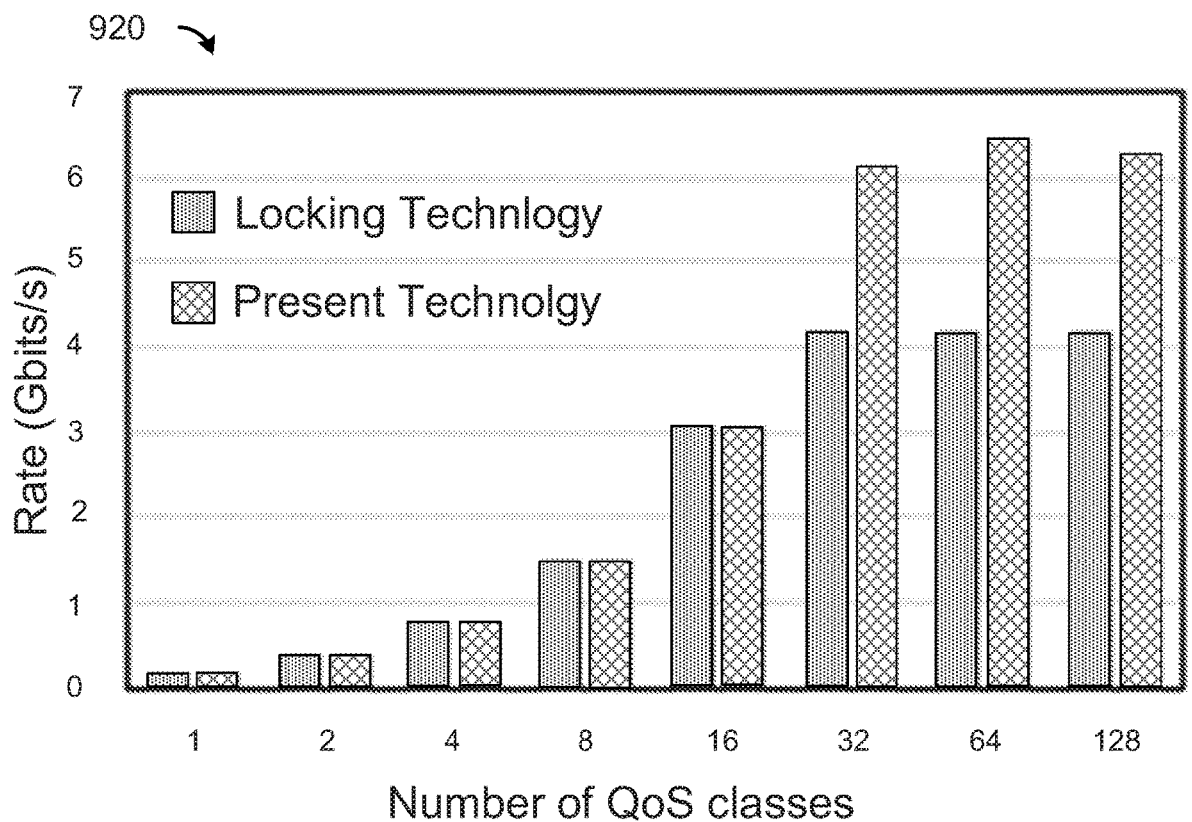
FIG. 10 illustrates a table of experimental results according to embodiments of the present technology.

Committed rate cr is a rate at which tokens are added to buckets in a token bucket management method. In an embodiment, a committed rate cr is measured in bytes of IP packets per second. In an embodiment, each QoS class could have its own committed rate cr. For a QoS class j, cr(j) denotes the QoS class j committed rate. However in the experiments, all QoS classes are assigned the same committed rate cr. For example, FIG. 9A illustrates a graph 900 of rate versus number of QoS classes with a committed rate for each QoS class of 64 Mbits/s. FIG. 9B illustrates a graph 910 of rate versus number of QoS classes with a committed rate cr for each QoS class of 128 Mbits/s. FIG. 9C illustrates a graph 920 of rate versus number of QoS classes with a committed rate cr for each QoS class of 192 Mbits/s. Packets of size 64 bytes are generated from a pktgen traffic generator with random source and destination IP, ensuring that all QoS classes in the rate limiter are evenly covered. The number of QoS classes ranges from 1 to 128, and four processor cores are used for rate limiting in each experiment.

As seen in FIG. 9A, both the locking technology (RSS) and present technology (multi-core lock-free limiter) obtain a linear increasing output rate when the number of QoS classes is below 128. An expected output rate may be calculated at 320 in FIG. 3C where there are m cores platform with n QoS classes, $0 \leq i < m$ and $0 \leq j < n$, in an embodiment.

When there are 128 QoS classes, the expected output rate is 128*64Mbits/s=8.192 Gbits/s. Though both technologies do not achieve the expected output rate, the present technology still gets nearly 50% more throughput (6.27 Gbits/s compared to 4.181 Gbits/s). FIGS. 9B and 9C shows similar experimental results.

Figure 11:
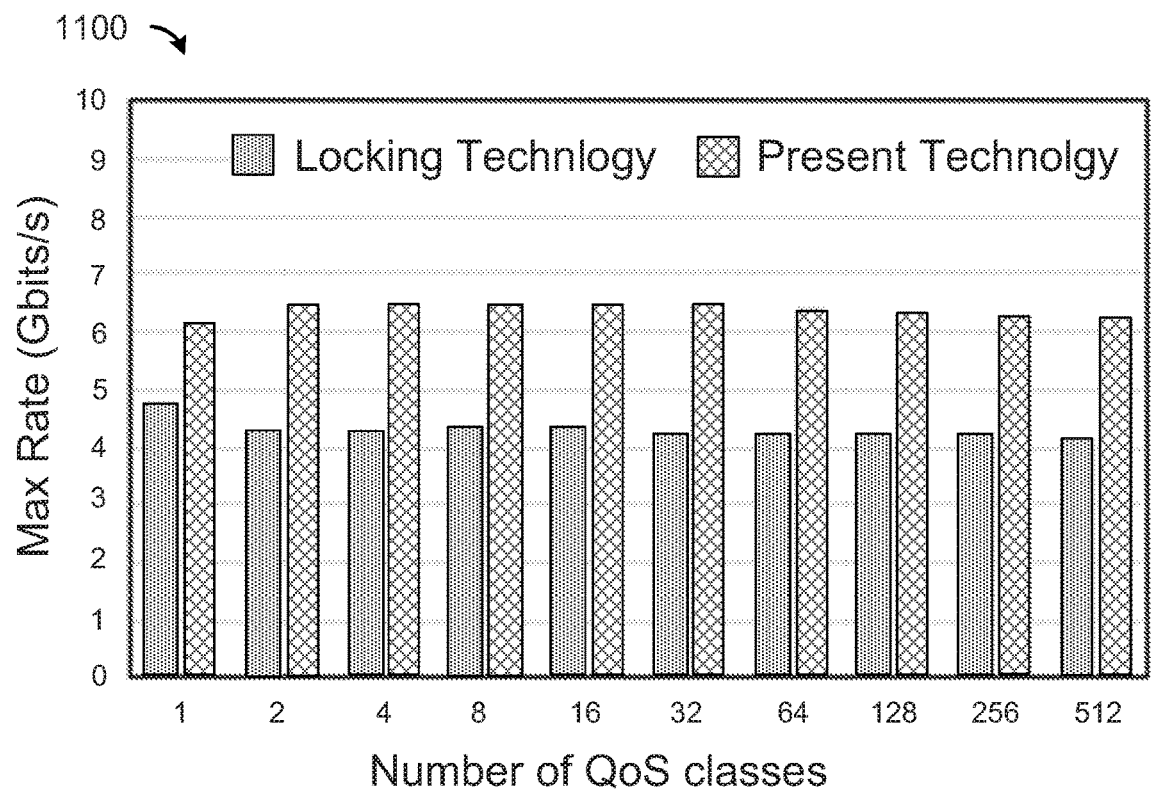
FIG. 11 illustrates maximum rates for different QoS class numbers according to embodiments of the present technology.

Several experiments were also conducted to evaluate the maximum supported limiting rate of the locking technology and the present technology. FIG. 11 depicts the results of the rate limiter with four processor cores and 16 QoS classes in total. As the number of QoS classes grows, the output rate of the locking technology decreases due to frequent lock contention. Since the source and destination IP of input packets are randomized, the more QoS classes the rate limiter needs to deal with, the more likely different cores access one QoS class queue at the same time.

In contrast, the performance of the present technology remains stable due to the introduction of virtual class queue isolating the simultaneously access to the same queue by different processor cores. Experimental results indicate that under the circumstance of four processor cores with 16 QoS classes, the present technology achieves the maximum limiting rate of 6.373 Gbits/s, approximately 48% more than the locking technology at the same condition (4.297 Gbits/s).

Experiments were also conducted using different input packet sizes. Four processor cores are used to limit the rate, and 8 QoS classes are set with 64Mbits/s committed rate for each class. A Pktgen traffic generator is configured to generate packets varying from small packet size such as 64 bytes, 320 bytes to large packets of 1500 bytes. Moreover, a mixed packet set filled with these small and large packets is generated as well. As table 1000 in FIG. 10 illustrates, the output rate of present technology, which is exactly the sum of each class's expected committed rate, stays almost constant regardless of the packet size.

Figure 12:
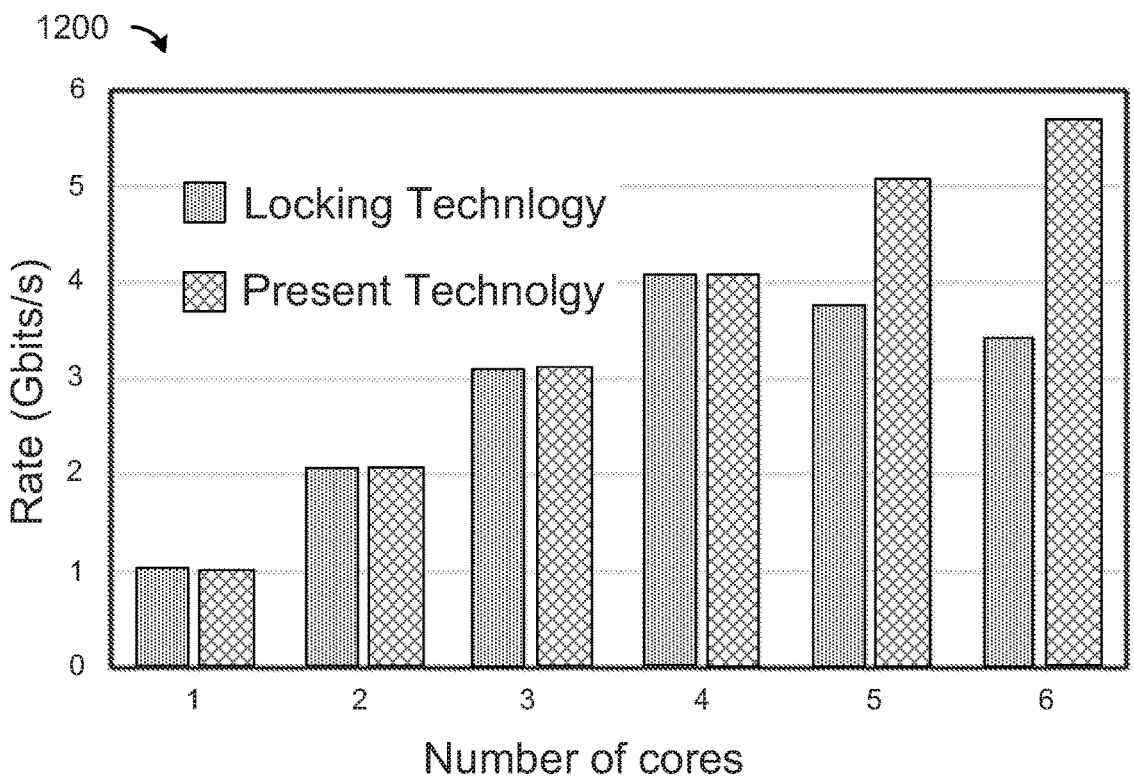
FIG. 12 illustrates experimental results according to embodiments of the present technology.

In order to evaluate the scalability of the current technology, several experiments were conducted using different number of processor cores, ranging from 1 to 6. 16 QoS classes were assigned to each processor core and a 64Mbits/s committed rate for each QoS class was used. Random packets with a size of 64 bytes are sent from a Pktgen traffic generator to a limiter. FIG. 12 illustrate that as the number of cores increases, the output rate of present technology keeps improving. On the contrary, the locking technology achieves the highest output rate when 4 processor cores are used. In the case of 6 cores, the present technology achieves 5.634 Gbits/s output rate while the locking technology only reaches a 3.463 Gbits/s output rate. The present technology obtains more than approximately 60% performance improvement.

Returning to FIG. 1, controller 190 includes a user interface that may include computer instructions that may be executed by the processor of controller 190 as well as additional hardware components in embodiments. A user interface may include input devices such as a touchscreen, microphone, camera, keyboard, mouse, pointing device and/or position sensors. Similarly, a user interface may include output devices, such as a display, vibrator and/or speaker, to output images, characters, vibrations, speech and/or video as an output. A user interface may also include a natural user interface where a user may speak, touch or gesture to provide input. In embodiments, a user interface may be used to control or provide inputs to a multi-core lock-free rate limiter technology as described herein.

Advantages of the present technology may include, but are not limited to, providing core/thread level isolation using virtual class queues as well as read/write operation isolation to virtual class queues. Other advantages include a standalone scheduler that takes care of parameter update. Two additional parameters, demand rate and supply rate values, are attached or associated with each virtual class queue to synchronize the QoS constraints among multi-cores. In comparison with typical multi-core rate limiting technology, the present technology may achieve approximately 50% to approximately 60% higher maximum supported limiting rate. Experimental results may show the present technology scales with increased processor cores while maintaining stable performance when using different packet sizes.

The flowcharts and block diagrams in the figures illustrate the architecture, functionality, and operation of possible implementations of a device, apparatus, system, computer-readable medium and method according to various aspects of the present disclosure. In this regard, each block (or arrow) in the flowcharts or block diagrams may represent operations of a system component, software component or hardware component for implementing the specified logical function(s). It should also be noted that, in some alternative implementations, the functions noted in the block may occur out of the order noted in the figures. For example, two blocks (or arrows) shown in succession may, in fact, be executed substantially concurrently, or the blocks (or arrows) may sometimes be executed in the reverse order, depending upon the functionality involved. It will also be noted that each block (or arrow) of the block diagrams and/or flowchart illustration, and combinations of blocks (or arrows) in the block diagram and/or flowchart illustration, can be implemented by special purpose hardware-based systems that perform the specified functions or acts, or combinations of special purpose hardware and computer instructions.

It will be understood that each block (or arrow) of the flowchart illustrations and/or block diagrams, and combinations of blocks (or arrows) in the flowchart illustrations and/or block diagrams, may be implemented by non-transitory computer instructions. These computer instructions may be provided to and executed (or read) by a processor of a general purpose computer (or network element), special purpose computer, or other programmable data processing apparatus to produce a machine, such that the instructions executed via the processor, create a mechanism for implementing the functions/acts specified in the flowcharts and/or block diagrams.

As described herein, aspects of the present disclosure may take the form of at least a system, an apparatus, a device (network element) having one or more processors executing instructions stored in non-transitory memory, a computer-implemented method, and/or a non-transitory computer-readable storage medium storing computer instructions.

Non-transitory computer-readable media includes all types of computer-readable media, including magnetic storage media, optical storage media, and solid state storage media and specifically excludes signals. It should be understood that software including computer instructions can be installed in and sold with a computing device (network element) having computer-readable storage media. Alternatively, software can be obtained and loaded into a computing device, including obtaining the software via a disc medium or from any manner of network or distribution system, including, for example, from a server owned by a software creator or from a server not owned but used by the software creator. The software can be stored on a server for distribution over the Internet, for example.

More specific examples of the computer-readable medium include the following: a portable computer diskette, a hard disk, a random access memory (RAM), ROM, an erasable programmable read-only memory (EPROM or Flash memory), an appropriate optical fiber with a repeater, a portable compact disc read-only memory (CD-ROM), an optical storage device, a magnetic storage device, or any suitable combination thereof.

Non-transitory computer instructions used in embodiments of the present technology may be written in any combination of one or more programming languages. The programming languages may include an object oriented programming language such as Java, Scala, Smalltalk, Eiffel, JADE, Emerald, C++, CII, VB.NET, Python, R or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The computer instructions may be executed entirely on the user's computer (or network element), partly on the user's computer, as a stand-alone software package, partly on the user's computer and partly on a remote computer (network controller), or entirely on the remote computer or server. In the latter scenario, the remote computer may be connected to the user's computer through any type of network, or the connection may be made to an external computer (for example, through the Internet using an Internet Service Provider) or in a cloud computing environment or offered as a service such as a Software as a Service (SaaS).

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the detailed description of the present subject matter, numerous specific details are set forth in order to provide a thorough understanding of the present subject matter. However, it will be clear to those of ordinary skill in the art that the present subject matter may be practiced without such specific details.

Although the subject matter has been described in language specific to structural features and/or methodological steps, it is to be understood that the subject matter defined in the appended claims is not necessarily limited to the specific features or steps (acts) described above. Rather, the specific features and steps described above are disclosed as example forms of implementing the claims.

What is claimed is:

1. An apparatus comprising:
a receiver configured to receive a plurality of packets;
a memory configured to store instructions and form a first and second set of virtual queues to store the plurality of packets, first virtual queues in the first set of virtual queues comprising a first subclass queue that form a first class queue and second virtual queues in the second set of virtual queues comprising a second subclass queue that form a second class queue; and
a processor having one or more cores, a first core of the one or more cores accessing the first set of virtual queues and a second core of the one or more cores accessing the second set of virtual queues such that the first set of virtual queues is inaccessible to the second core of the one or more cores and the second set of virtual queues is inaccessible to the first core of the one or more cores, with one or more packet classifiers configured to provide a classification of a packet in the plurality of packets, the processor in communication with the memory executes the instructions to:
transfer the packet from the receiver to one or more of the virtual queues in the first set of virtual queues based on the classification; and
transfer the packet from the one or more virtual queues to a transmitter based on a demand rate value and supply rate value associated with each of the one or more virtual queues in the first set of virtual queues forming the first class queue.

2. The apparatus of claim 1, wherein a first core in the processor includes a first packet classifier to access the first set of virtual queues and a second core in the processor includes a second packet classifier to access the second set of virtual queues.

3. The apparatus of claim 2, wherein the first set of virtual queues have an associated first set of demand rate values and an associated first set of supply rate values, wherein the demand rate value is included in the associated first set of demand rate values and calculated by the first core and the supply rate value is included in the associated first set of supply rate values and is calculated by another core.

4. The apparatus of claim 3, wherein the second set of virtual queues have an associated second set of demand rate values and an associated second set of supply rate values.

5. The apparatus of claim 4, wherein the first core calculates the associated first set of demand rate values and the second core calculates the associated second set of demand rate values.

6. The apparatus of claim 5, wherein another core is included in a network controller in communication with a scheduler, wherein the network controller calculates the associated first set of supply rate values and the associated second set of supply rate values.

7. The apparatus of claim 6, wherein the first core writes the associated first set of demand rate values to the memory, and the second core writes the associated second set of demand rate values to the memory, wherein the network controller reads the associated first and second sets of demand rate values from the memory.

8. The apparatus of claim 7, wherein the network controller writes the associated first and second sets of supply rate values to the memory, wherein the first core reads the associated first set of supply rate values, and wherein the second core reads the associated second set of supply rate values.

9. The apparatus of claim 1, wherein the demand rate value is calculated based on an amount of time and a number of packets that arrive at the virtual queue.

10. The apparatus of claim 9, wherein the supply rate value is calculated based on the demand rate value and a committed rate.

11. A network to transfer a plurality of packets comprising:
   a memory including:
      a first set of virtual queues having a first set of demand rate values and a first set of supply rate values, first virtual queues in the first set of virtual queues comprising a first subclass queue that form a first class queue, and
      a second set of virtual queues having a second set of demand rate values and a second set of supply rate values, second virtual queues in the second set of virtual queues comprising a second subclass queue that form a second class queue;
   a first processor including:
      a first core having a receiver configured to receive a first packet in the plurality of packets and a first packet classifier to classify the first packet, the first packet classifier outputs the first packet to a first virtual queue in the first set of virtual queues based on a classification of the first packet, the first core calculating the first set of demand rate values,
      a second core having a receiver configured to receive a second packet in the plurality of packets and a second packet classifier to classify the second packet, the second packet classifier outputs the second packet to a second virtual queue in the second set of virtual queues based on a classification of the second packet, the second core calculating the second set of demand rate values;
      the first set of virtual queues being inaccessible to the second core and the second set of virtual queues being inaccessible to the first core; and
   a second processor configured to calculate the first and second sets of supply rate values based on the first and second sets of demand rate values, the second processor outputting one or more control signals to output the first and second packets from the first and second virtual queues based on the first and second sets of supply rate values.

12. The network of claim 11, wherein the memory and first processor are included in a network element to transfer the plurality of packets, and wherein the second processor is in communication with a scheduler included in a network controller.

13. The network of claim 12, wherein the network element is selected from a switch, router, bridge, firewall, server and client.

14. The network of claim 11, wherein a demand rate value in the first set of demand rate values associated with the first virtual queue is calculated based on a token update period of time and a number of packets that arrive at the first virtual queue.

15. The network of claim 11, wherein a supply rate value associated with the first virtual queue is calculated based on the demand rate value and a committed rate.

16. A computer-implemented method to limit a transfer of a plurality of packets, the method comprising:
   receiving a plurality of packets;
   classifying one of the packets in the plurality of packets to obtain a classification of the packet;
   transferring the packet to a virtual queue in a plurality of virtual queues based on the classification, with the classifying and transferring being performed by a core in communication with a classifier, the core being included in an integrated circuit processor having a plurality of respective cores and a plurality of classifiers stored in memory, with the plurality of virtual queues of the core being inaccessible by each of the other plurality of respective cores in the integrated circuit;
   storing the packet in the virtual queue, wherein the virtual queue in the plurality of virtual queues is a subclass queue that forms a first class queue;
   calculating a plurality of demand rate values for each of the plurality of virtual queues;
   calculating a plurality of supply rate values for each of the plurality of virtual queues based on the plurality of demand rates; and
   outputting the packet stored in the virtual queue based on a supply rate associated with the virtual queue.

17. The computer-implemented method of claim 16, wherein calculating the plurality of demand rate values is performed by the plurality of respective cores and calculating the plurality of supply rate values is performed by a scheduler core in communication with a scheduler.

18. The computer-implemented method of claim 16, wherein the plurality of virtual queues are formed in an memory, and wherein the plurality of virtual queues include a first and second set of virtual queues, wherein the virtual queue is included in the first set of virtual queues and another virtual queue is included in the second set of virtual queues, and wherein the virtual queue and another virtual queue form a class queue for the classification.

19. The apparatus of claim 1, wherein the demand rate value and the supply rate value are associated with each set of virtual queues to synchronize QoS constraints among the one or more cores.

* * * * *